United States Patent [19]

Tanahashi et al.

[11] 3,976,738

[45] Aug. 24, 1976

[54] PROCESS FOR PRODUCING ANTISTATIC ACRYLIC FIBERS

[75] Inventors: Kunio Tanahashi; Yukitoshi Nariai, both of Okayama, Japan

[73] Assignee: American Cyanamid Company, Stamford, Conn.

[22] Filed: Dec. 13, 1973

[21] Appl. No.: 424,269

[52] U.S. Cl. ..................... 264/182; 260/29.6 AN; 260/829
[51] Int. Cl.² ........................................... D01F 6/18
[58] Field of Search.... 264/182; 260/88.5, 29.6 AN, 260/829

[56] References Cited
UNITED STATES PATENTS

| | | | |
|---|---|---|---|
| 2,384,881 | 9/1945 | Britton et al. | 260/829 |
| 2,563,898 | 8/1951 | Wilson et al. | 260/829 |
| 2,955,017 | 10/1960 | Boyer | 264/184 |
| 3,051,545 | 8/1962 | Steuber | 264/182 |
| 3,133,135 | 5/1964 | Ogle | 264/182 |
| 3,242,120 | 3/1966 | Steuber | 260/29.6 AN |
| 3,544,487 | 12/1970 | Dunlop et al. | 260/874 |
| 3,644,567 | 2/1972 | Smith et al. | 260/874 |

*Primary Examiner*—Jay H. Woo
*Attorney, Agent, or Firm*—William J. van Loo

[57] ABSTRACT

Acrylic fibers have a decreased tendency to accumulate static charges when the spinning solution from which the fibers are spun has incorporated therein a polymer of tetrohydrofuran, which polymer remains durably adhered to the formed fiber.

5 Claims, No Drawings

PROCESS FOR PRODUCING ANTISTATIC ACRYLIC FIBERS

This invention relates to a process for producing acrylic fibers having a reduced tendency to accumulate static charges. More particularly, the invention relates to such a process wherein a polymer of tetrahydrofuran is incorporated in the fiber-making spinning solution and is carried over in the formed fiber durably adhered to provide long-lasting anti-static activity.

Acrylic fibers are widely used in applications such as clothing and interior furnishings because of their highly desirable properties which include dimensional stability, weather resistance, dyeability, aesthetic qualities, bulking ability, and insulating ability. These fibers, however, have an undesirable tendency to accumulate static charges and this deficiency causes unpleasant sensations when wearing cloths of such fibers or when walking on carpets of such fibers.

It is already known that the simple and convenient method for overcoming the deficiency of static charge accumulation is to treat the acrylic fiber with a surface active agent. However, such treatment is non-durable in nature and is lost upon a single washing of the fiber treated. Thus, no lasting effect is possible using surface active agents. A method for imparting durable antistatic activity recently suggested is that of incorporating a surface active agent such as a polyethylene oxide or derivative thereof into the spinning solution from which the acrylic fiber is spun. However, the surface active agents contemplated for use in this method are essentially water soluble or self-emulsifiable and, therefore, are readily removed upon wet processing, such as dyeing or laundering. Accordingly, this suggested method does not provide durable antistatic activity and can interfere in the fiber-spinning process.

In accordance with the present invention there is provided a process for producing acrylic fiber having durable antistatic properties which comprises preparing a spinning solution of a fiber-forming acrylonitrile polymer containing at least 40 weight precent of acrylonitrile and any balance of one or more ethylenically unsaturated monomers copolymerizable therewith in a suitable solvent therefor, uniformly mixing in said spinning solution a poly(tetrahydrofuran) having a molecular weight of about 500 to 5000 in an amount from about 1 to 20 weight percent based on the weight of the acrylonitrile polymer, and thereafter spinning the resulting mixture into fiber.

When the process is carried out as described, the stability and spinnability of the spinning solution is not adversely affected, the poly(tetrahydrofuran), which is substantially water insoluble, is not lost upon wet processing such as dyeing or washing and long-lasting anti-static properties are obtained. In addition, because the anti-static agent is durable, problems of pollution arising from contamination of the waste waters with the non-durable agents removed in such steps as washing, dyeing, finishing, and the like are avoided.

In carrying out the present process, useful fiber-forming polymers are those which contain at least 40 weight percent of acrylonitrile and any balance of one or more ethylenically unsaturated monomers copolymerizable therewith. The polymers, therefore, are such as to encompass fibers which are classed as modacrylic and acrylic fibers. The polymers are obtained by conventional polymerization procedures, such as emulsion, suspension, or solution polymerization. Typical comonomers include acrylic and methacrylic acids and esters thereof such as the methyl and ethyl esters; acrylamide and methacrylamide and N-alkyl substituted derivatives thereof; vinyl esters such as vinyl acetate and vinyl propionate; vinyl and vinylidene halides such as vinyl chloride, vinyl bromide; unsaturated sulfonic acids such as vinylsulfonic acid, allylsulfonic acid, methallylsulfonic acid, and parastyrenesulfonic acid, as well as salts of said acids; and other well-known copolymerizable monomers such as styrene and methyacrylonitrile.

The useful fiber-forming polymer is dissolved in a well known polymer solvent for example organic solvents such as dimethyl formamide, dimethyl acetamide, ethylene carbonate or γ-butyrolactone and inorganic solvents such as concentrated aqueous solutions of sodium thiocyanate, calcium thiocyanate, zinc chloride, or nitric acid. The polymer solution generally will contain a polymer concentration of about 5 to 35 weight percent. It is, of course, possible to prepare such solution directly by polymerizing acrylonitrile and any comonomer content in the solvent used to form the spinning solution. A particularly preferred solvent type is the inorganic type which provides advantageous results.

The poly(tetrahydrofuran) used in the process of the present invention is derived from tetrahydrofuran which has the structure

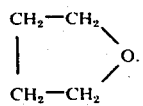

This ring compound is polymerized by cationic ring opening to form a polymer having repeating units of the structure

wherein $n$ is an integer from 7 to 70. The terminal groups X and Y may vary depending upon the method of polymerization. In its simplest form, the terminal group Y may be hydrogen and X may be hydroxyl, both arising from water. These polymers and their preparative method are more fully described in Encyclopedia of Polymer Science and Technology, Interscience Publishing Co., Volume 13, pages 670–691 (1970).

The poly(tetrahydrofuran) should have a molecular weight of at least about 500 to provide the water insolubility desired and this corresponds to a value of $n$ of 7 or more. There is no critical limit as to the upper limit of molecular weight but generally values in excess of about 5,000, or where $n$ is about 70, are generally not available commercially. Where available, terminal groups of organic residues other than tetrahydrofuran hydrolysates may be employed.

The amount of poly(tetrahydrofuran) to be incorporated in the spinning solution may vary widely depending upon the degree of antistatic activity desired and nature of the fiberforming polymer employed. Generally, a range of about 1 to 20 weight percent based on the weight of the fiber-forming polymer is effective.

The spinning solution with its incorporated content of poly(tetrahydrofuran) is spun into fiber following conventional procedures. It is preferred to employ a wet-spinning procedure using the inorganic polymer solvents wherein the spun fiber is coagulated, water-washed, stretched, dried, and heat-relaxed according to the well known procedures, since such procedure provides a fiber of excellent properties.

The invention is more fully illustrated by the examples which follow, wherein all parts and percentages are by weight unless otherwise designated.

The antistatic activity is indicated in the following manner. A fabric sample was subjected to an applied voltage of 1000 volts for three minutes with a rotating velocity of 1000 rpm using a conventional testing device. The sample was first dried at 70°C. for 1 hour and conditioned overnight in a thermostatic chamber at 20°C. and a relative humidity of 40 percent prior to application of electricity thereto. The samples were tested immediately after removal of the applied electricity. The charge built up by the application on electricity was allowed to decay. As is customary, the value liquor: cloth ratio of 30:1. The fabrics were entered into the bath at 60°C. and heated to 100°C. over 30 minutes and then maintained at 100°C. for 60 minutes.

The fabrics were then tested for initial antistatic properties. These properties were also measured after 5 launderings and after dry-cleaning. Each wash was with 2 grams per liter of detergent at a liquor to cloth ratio of 50 to 1 at 40°C. for 10 minutes. The fabrics were rinsed for 20 minutes and then dried in conjunction with the antistatic test procedure. Domestic washing equipment was used. Dry-cleaning was in tetrachloroethylene containing commercial dry-cleaning detergents at conventional levels at a liquor:cloth ratio of 20:1 at room temperature for 10 minutes, followed by two rinses with tetrachloroethylene of ten minutes each.

The results of spinning and antistatic testing are given in Table I.

TABLE I

|  | PROPERTY | EXAMPLE 1 | COMP. EX. A | CONTROL |
|---|---|---|---|---|
| Operability | Spinnability | No Difficulty | Some Difficulties | No Difficulty |
|  | Bubbles Generated In Washing Coagulated Fiber | None | Considerable | None |
| Antistatic Properties (Half-Life) | Initial | 21 Seconds | Greater than 3 Min. | Greater than 3 Min. |
|  | After 5 Washes | 54 Seconds | Greater than 3 Min. | Greater than 3 Min. |
|  | After Dry Cleaning | 42 Seconds | Greater than 3 Min. | Greater than 3 Min. | reported is the half life for complete decay of the charge. It can, of course, be appreciated that the shorter the half life of the electric charge, the lower is the tendency of the sample to develop static charges. Generally, fabrics showing a half life of electrical charge of less than about 3 minutes when tested as described are considered to have a desirable level of antistatic activity.

EXAMPLE 1

A spinning solution was prepared by dissolving 11 parts of a copolymer consisting of 91% of acrylonitrile and 9% methyl acrylate in 89 parts of an aqueous solution of 45% sodium thiocyanate. To the solution of the acrylonitrile compolymer were added 3%, based on the weight said copolymer, of a poly(tetrahydrofuran) of molecular weight 2004, which were uniformly dispersed in the spinning solution.

The mixture was spun into a aqueous solution of 12% sodium thiocyanate at −3°C. through a spinnerette of 50 orifices, each of a diameter of 0.09 millimeter. The gel fibers were washed with water and then stretched at 25°C. at a stretch ratio of 2 and then stretched in boiling water at a stretch ratio of 5. The stretched fibers were dried according to conventional practice to collapse the gel structure and then heat-relaxed in steam at 125°C. The fiber obtained was of about 6 deniers.

For comparison purposes, the above precedure was repeated omitting the poly(tetrahydrofuran) to provide a control fiber free of antistatic agent. In another comparison, the above procedure was again followed adding a commercial fatty acid ester of a polyethylene glycol as the antistatic in place of poly(tetrahydrofuran) and the fiber was designated as Comparative Example A.

The three fiber samples were then fabricated into coarse knit fabrics. A simulated dyeing was performed on the fabric using 2 grams per liter of detergent at a The data in Table I show that use of poly(tetrahydrofuran) in accordance with the present invention provides acrylic fiber of highly desirable antistatic properties without adverse effect on operability of the fiber-spinning process and the antistatic properties obtained are durable to laundering and dry-cleaning. Contrary to this, use of polyethylene glycol surface active agent as a spinning solution additive interferes with operability of the fiber-spinning process and does not provide effective antistatic properties initially or after laundering or dry cleaning.

EXAMPLE 2

The spinning solution employed was the same as that of Example 1. To this solution was added 5%, based on the weight of the fiber-forming polymer, of a poly(tetrahydrofuran) of molecular weight of 860 and a uniform mixture was prepared. The mixture was then spun as in Example 1 except that the spinnerette orifices were of 0.07 millimeter diameter. The acrylic fiber obtained was of 3 deniers. The fibers were mechanically crimped, lubricated, and cut into a staple length of 57 millimeters.

For comparison purposes, fibers were prepared in the same manner substituting in Comparative Example B polyethylene glycol of molecular weight 1000 and in Comparative Example C polypropylene glycol of molecular weight 1000 for the poly(tetrahydrofuran) used in Example 2.

A fiber blend was prepared of each of the fiber samples using 40% of an individual test fiber with 20% of conventional untreated composite fibers and 40% conventional untreated shrinkable acrylic fibers. The fiber blends were spun into yarns and subsequently fabricated into interlocked hosiery knits. The samples were then evaluated as in Example 1 and the results are given in Table II.

TABLE II

| | PROPERTY | EXAMPLE 2 | COMP. EX. B | COMP. EX. C. |
|---|---|---|---|---|
| Operability | Spinnability | Good | Poor | Good |
| | Bubbles Generated In Washing Coagulated Fiber | Few | Excessive | Considerable |
| Antistatic Properties (Half-Life) | Initial | 9.9 Sec. | Greater than 3 Min. | Greater than 3 Min. |
| | After 3 Launderings | 15.2 Sec. | Greater than 3 Min. | Greater than 3 Min. |
| | After 10 Launderings | 18.0 Sec. | Greater than 3 Min. | Greater than 3 Min. |

The data of Table II again show that durable antistatic properties obtained without adverse effects on operability of the spinning process in accordance with the present invention. The data also show that other additives, although adversely affecting operability of the spinning process, do not provide antistatic properties.

We claim:

1. A process for producing acrylic fiber having durable antistatic properties which comprises preparing a spinning solution of a fiber-forming acrylonitrile polymer containing at least 40 weight percent acrylonitrile and any balance of one or more ethylenically unsaturated monomers copolymerizable therewith in a suitable solvent therefor, uniformly mixing in said spinning solution a poly(tetrahydrofuran) having a molecular weight of about 500 to 5,000 in an amount from about 1 to 20 weight percent based on the weight of the acrylonitrile polymer, and thereafter spinning the resulting mixture into fiber.

2. The process of claim 1 wherein the fiber-forming polymer is dissolved in an inorganic polymer solvent.

3. The process of claim 1 wherein the mixture is spun by a wet-spinning procedure.

4. The process of claim 1 wherein the spinning solution contains 5 to 35 weight percent of fiber-forming polymer.

5. The process of claim 2 wherein the fiber-forming polymer is dissolved in an aqueous thiocyanate salt solution.

* * * * *